Patented Feb. 2, 1937

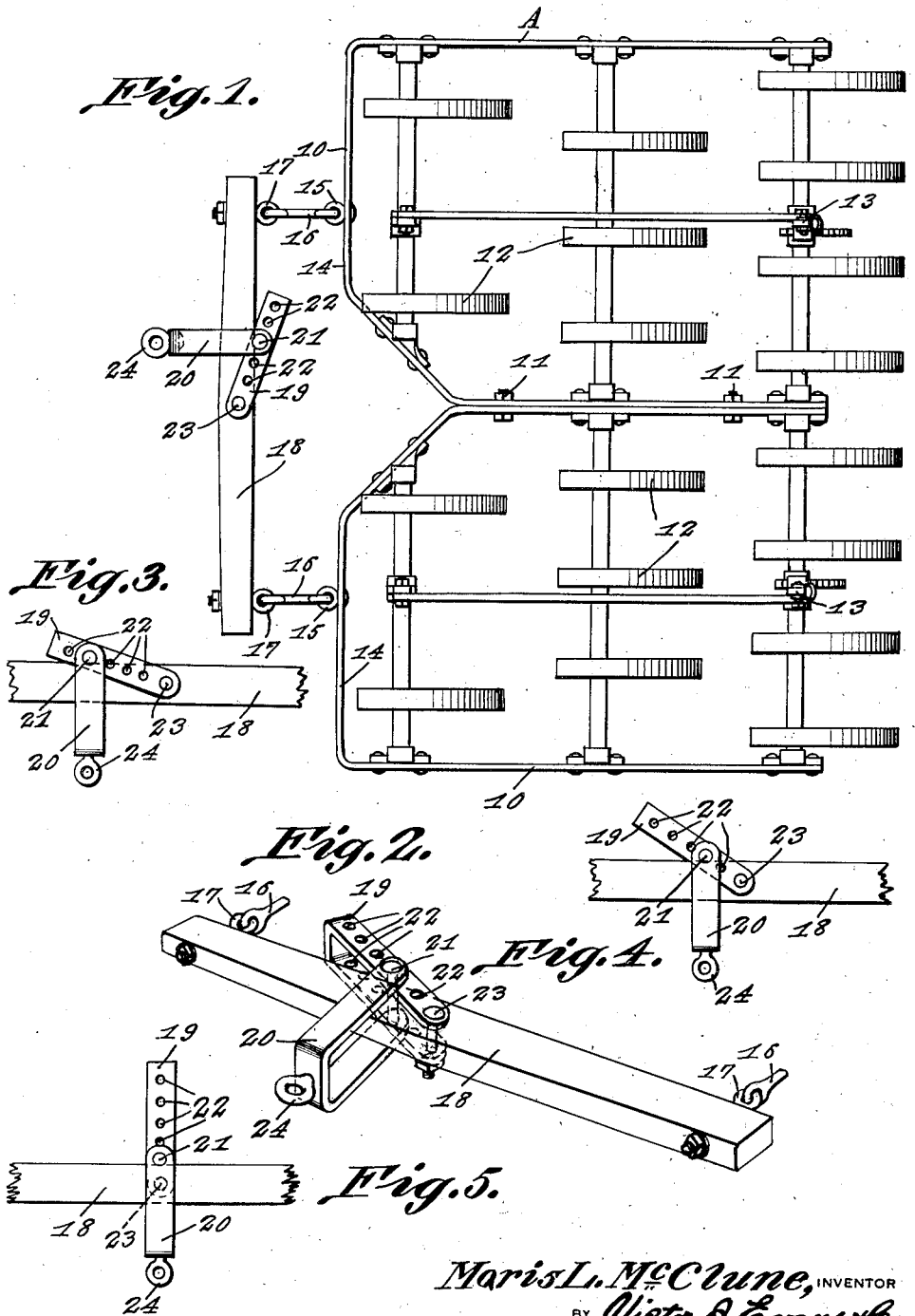

2,069,416

UNITED STATES PATENT OFFICE 2,069,416

HITCH

Maris L. McClune, Kirkwood, Pa.

Application November 6, 1935, Serial No. 48,578

1 Claim. (Cl. 278—96.3)

The invention relates to a draft connection and more especially to a hitch for ground working implements.

The primary object of the invention is the provision of a hitch of this character, wherein the same will enable a ground working implement to travel straight for the working on a level or upon a hill, the hitch being especially adaptable for toothed harrows.

Another object of the invention is the provision of a hitch of this character, wherein the draft to a ground working implement is assured and will enable the turning of the implement and the pull thereon being effected at the center or either side of the line of draft and at the uppermost portion of such implement.

A further object of the invention is the provision of a hitch of this character, which is automatic in the working thereof and will prevent a harrow equipped with the same from shifting downwardly and thus materially increasing the efficiency of such harrow in the operation of the same.

A still further object of the invention is the provision of a hitch of this character, which is extremely simple in construction, thoroughly reliable and effective in its purpose, strong, durable and inexpensive to manufacture and install.

With these and other objects in view the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is a plan view of a harrow showing the hitch constructed in accordance with the invention applied thereto.

Figure 2 is a perspective view of the hitch and the same being in an adjusted position different from that shown in Figure 1.

Figure 3 is a fragmentary top plan view showing a further adjustment of the hitch.

Figure 4 is a fragmentary top plan view showing the hitch in the adjusted position as in Figure 2.

Figure 5 is a fragmentary top plan view showing the hitch for the central draft of the implement.

Similar reference characters indicate corresponding parts throughout the several views in the drawing.

Referring to the drawing in detail, A designates generally a spring toothed harrow of standard construction including the frames 10 arranged side by side and joined through fasteners 11, the teeth 12 of the harrow being adjustable through the medium of the control devices 13, these being hand operable.

Carried at the front of the frames 10 and secured in the forward cross bars 14 thereof are eyes 15 with which are loosely connected links 16, these being also connected with eyes 17 carried in a draft bar 18 near opposite ends thereof, the said bar being disposed transversely and is equipped with the hitch constituting the present invention and hereinafter fully described.

The hitch comprises a pair of substantially U-shaped members 19 and 20, respectively, the latter being fitted with a removable coupling pin 21 selectively engageable in spaced vertically aligned holes 22 provided in the member 19. The member 19 has swinging connection with the draft bar 18 at its center through the medium of a pivot pin or bolt 23 and this member 19 works arcuately rearwardly of the draft bar 18 while the member 20 is extended forwardly and straddles said draft bar 18 while at the closed outer end of the member 20 is swiveled an eye 24 for receiving a hook or any other suitable means for connecting a double tree or single tree for the draft of the harrow or ground working implement by draft animals.

On adjustment of the member 20 in its coupling connection with the member 19 the line of draft of the harrow A is regulated and as will appear from Figures 2, 3, 4 and 5 of the drawing the draft can be had at the longitudinal center of the harrow or at either side thereof according to the level or incline of drag of such harrow so that the latter will operate straight with the line of draft of the same.

When the harrow A is operating on the level ground the hitch will be in the position shown in Figure 5 of the drawing then when the harrow is operating on an incline the hitch may be in the positions shown in Figures 2, 3 and 4 of the drawing according to the lay or angle of the soil.

What is claimed is:

The combination of a draft bar having eyes at opposite ends thereof for link connection therewith of a ground working implement, a U-shaped member straddling the said bar from the rear thereof and having side limbs pivoted to the bar intermediate of its ends, another U-shaped member straddling the said bar and the first-mentioned member from the front of the bar and having a swiveled eye forwardly of said bar, and a coupling pin adjustably fixed in the first-mentioned member and pivotally connecting the last-mentioned member with the said first-mentioned member.

MARIS L. McCLUNE.